(12) United States Patent
Iijima et al.

(10) Patent No.: US 6,423,105 B1
(45) Date of Patent: *Jul. 23, 2002

(54) PROCESS FOR PRODUCING AN ELECTRODE FOR A BATTERY

(75) Inventors: Tadayoshi Iijima; Junichi Satoh, both of Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,404

(22) Filed: Apr. 23, 1999

Related U.S. Application Data

(63) Continuation of application No. PCT/JP97/03845, filed on Oct. 23, 1997.

(30) Foreign Application Priority Data

Oct. 23, 1996 (JP) .............................. 8-280513

(51) Int. Cl.$^7$ ................................. H01M 6/00
(52) U.S. Cl. .................... 29/623.1; 29/623.5; 429/231.8
(58) Field of Search ........................... 429/231.8, 218.1, 429/231.95, 232, 217, 231.4; 29/623.5, 623.1, 623.3

(56) References Cited

U.S. PATENT DOCUMENTS

| | | | |
|---|---|---|---|
| 5,478,674 A | * | 12/1995 | Miyasaka ..................... 429/218 |
| 5,518,839 A | | 5/1996 | Olsen |
| 5,571,637 A | * | 11/1996 | Idota ........................... 429/218 |
| 5,631,100 A | * | 5/1997 | Yoshino et al. ................ 429/62 |
| 5,665,491 A | * | 9/1997 | Tomiyama et al. .......... 429/194 |
| 5,707,756 A | * | 1/1998 | Inoue et al. ................... 429/57 |
| 6,022,518 A | * | 2/2000 | Yamazaki et al. ........... 423/448 |
| 6,051,343 A | * | 4/2000 | Suzuki et al. ................ 429/316 |
| 6,053,953 A | * | 4/2000 | Tomiyama et al. ......... 29/623.1 |

FOREIGN PATENT DOCUMENTS

| | | |
|---|---|---|
| EP | 0 537 709 | 4/1993 |
| JP | 8-138669 | 5/1986 |
| JP | 2-68855 | 3/1990 |
| JP | WO 98/18170 | 4/1998 |

OTHER PUBLICATIONS

Patent Abstracts of Japan, vol. 010, No. 219 (C–363), Jul. 31, 1986, JP 61–56285, Mar. 20, 1986.
Patent Abstracts of Japan, vol. 007, No. 276 (E–215), Dec. 9, 1983, JP 58–155653, Sep. 16, 1983.

\* cited by examiner

*Primary Examiner*—Stephen Kalafut
*Assistant Examiner*—Raymond Alejandro
(74) *Attorney, Agent, or Firm*—Oblon, Spivak, McClelland, Maier & Neustadt, P.C.

(57) ABSTRACT

A process for producing an electrode for a battery, wherein electrode active material layers are firmly formed on both surfaces of a current collector for the electrode. An electrode coating containing an electrode active material, a binder, a solvent and an acid is applied to one surface of an electrode current collector, then dried, and the other surface of the current collector is cleaned with water, and the electrode active material layer is formed on the other surface of the current collector.

15 Claims, No Drawings

PROCESS FOR PRODUCING AN ELECTRODE FOR A BATTERY

This application is a Continuation of international application PCT/JP97/03845, filed on Oct. 23, 1997.

BACKGROUND OF THE INVENTION

1. Field of the Invention

The present invention relates to a process for producing an electrode for a battery. In particular, the present invention relates to a process for producing an electrode for a battery, wherein an electrode active material layer can be firmly formed on both surfaces of a current collector for the electrode.

2. Description of the Background

Electrodes used in lithium ion secondary batteries are presently formed by applying a coating containing an electrode active material to both surfaces of a current collector of the electrode and drying the coating. In particular, a coating for the cathode contains a cathode active material and a binder, wherein the cathode active material is suitably dispersed therein in such a manner that it is not broken. The cathode coating is first applied to one surface of a metal foil as the electrode current collector and, after drying, it is also applied to the other surface thereof in the same manner as above, and then dried. Thus, the electrode active material layers are formed on both surfaces of the current collector for the electrode. Finally, the current collector for the electrode having the electrode active material layers formed on both surfaces thereof is cut into pieces, which is then used as the electrodes.

In the case where the coating film is formed on such a metal foil in the prior art, the adhesion between the metal foil and the electrode active material layer is insufficient to causing this problem, it has the electrode active material layer to peel off. In addressing this problem, it has been proposed, for example, to increase a resin content of an electrode coating, and to add an acid. Also, Japanese Patent Unexamined Published Application (hereinafter referred to as "J. P. KOKAI") No. Hei 2-68855 discloses and specifically describes that the adhesion is improved by using an acid.

However, when such an acid is used another problem occurs. Specifically, when the electrode active material layer is formed on one surface (hereinafter referred to as "surface A") of the electrode current collector and then the same layer is formed on the other surface (hereinafter referred to as "surface B") thereof, the adhesion of the current collector to surface B is much decreased as compared with the adhesion of that to surface A. Therefore, the electrode thus prepared exhibits the peeling off of the electrode active material layer, particularly from the back surface (surface B) of the electrode current collector. When such peeling occurs, the capacity of the battery produced therefrom is lowered, or the electrode active material layer thus peeled off is interposed between a separator and, for example, a cathode electrode, and it breaks the separator to cause the short circuit of the cathode electrode and the anode electrode, disadvantageously. Such a product is, therefore, not practically usable as a battery element.

SUMMARY OF THE INVENTION

Accordingly, it is an object of the present invention to provide a process for producing an electrode for a battery by successively applying an electrode coating containing an electrode active material, a binder, a solvent and an acid to both surfaces of an electrode current collector to obtain excellent adhesion between the electrode active material layer and the electrode current collector and to avoid peeling-off of the electrode active material layers from both surfaces of the electrode current collector.

In particular, the above object and others are provided by a process for producing an electrode for a battery by successively applying an electrode coating containing an electrode active material, a binder, a solvent and an acid to both surfaces of an electrode current collector, wherein after applying the electrode coating to one surface of the electrode current collector and drying it, the other surface thereof is cleaned with water prior to the application of the electrode coating thereto.

DETAILED DESCRIPTION OF THE PREFERRED EMBODIMENTS

The present invention is predicated upon the surprising discovery that the above-described object can be effectively attained by a process for applying an electrode coating containing an electrode active material, a binder, a solvent and an acid to both surfaces of an electrode current collector successively, wherein after applying the electrode coating to one surface of the electrode current collector and drying it, the other surface thereof is cleaned with water prior to the application of the electrode coating thereto. The present invention has been completed on the basis of this finding.

In more detail, the electrode coating used in the present invention contains an electrode active material, a binder, a solvent and an acid.

The electrode active materials usable herein are not particularly limited and those used hitherto as the electrode active materials are usable.

The materials used as the electrode active materials are various, and they are selected suitably depending on the use for the cathode or anode. Carbonaceous materials are those usually used as the cathode active materials. The carbonaceous materials are those used hitherto and not particularly limited. They are, for example, amorphous carbon, acetylene black, petroleum coke, coal coke, artificial graphite, natural graphite, graphite carbon fibers and difficultly graphitizable carbon.

The anode active materials are those used hitherto. Various cathode active materials, are usable without particular limitation. Various cathode active materials, such as lithium cobaltate and lithium manganate are usable.

The electrode coating in the present invention contains usually about 10 to 75% by weight, based on the solid content of the electrode coating, and preferably about 25 to 55% by weight, of the electrode active material.

Any binder may be useable so long as it is conventionally used in this technical field, without particular limitation. The binder includes, for example, polyacrylonitrile (PAN), polyethylene terephthalate, polyvinylidene fluoride (PVDF) and polyvinyl fluoride.

The binder is used in an amount of about 1 to 40 parts by weight, preferably about 2 to 25 parts by weight, and particularly about 5 to 15 parts by weight, per 100 parts by weight of the electrode active material.

The solvent is not particularly limited and any of those used hitherto for the preparation of electrode coatings can be used. The solvent includes, for example, N-methylpyrrolidone (NMP), pyrrolidone, N-methylthiopyrrolidone, dimethylformamide (DMF), dimethylacetamide and hexamethylphosphamide. They are used either alone or in the form of a mixture of them.

The solvent is used in such an amount that the solid content (nonvolatile matter content) of the electrode coating is about 10 to 80% by weight, preferably about 30 to 60% by weight and particularly preferably about 35 to 45% by weight.

The acid may be either an organic acid or an inorganic acid. As the acids, weak acids are preferred, and weak organic acids are particularly preferred. Preferred examples of the weak organic acids include oxalic acid, formic acid and maleic acid, and hydrates of these acids.

The acid is used in an amount of usually about 0.001 to 5 parts by weight, preferably about 0.01 to 3 parts by weight, per 100 parts by weight of the electrode active material.

When the electrode active material has a low electric conductivity, an electric conductor can be used, if necessary. As the electric conductors, the above-described carbonaceous materials are usable. In this cases the electric conductor is used in an amount of usually about 1 to 25 parts by weight, preferably about 3 to 15 parts by weight and particularly preferably about 5 to 10 parts by weight, per 100 parts by weight of the active material.

Metal foils are preferably used as the electrode current collectors in the present invention. The metal materials for the electrode current collectors are not particularly limited, and various metal materials used hitherto for this purpose are usable. Such metal materials are, for example, copper, aluminum, stainless steel, nickel and iron.

The electrode coating used in the present invention is prepared by mimed the above-described ingredients together, and it is in the form of a slurry. The electrode active material must be suitably dispersed in the electrode coating to such an extent that it is not broken. The mixing and dispersion are conducted by means of a planetary mixer, ball mill or the like.

The electrode coating is applied to both surfaces of the electrode current collector and dried to form the electrode active material layers.

The electrode coating can be applied to the electrode current collector by a well-known method such as extrusion coating, gravure coating, reverse roll coating, dip coating, kiss coating, doctor coating, knife coating, curt coated or screen printing.

The electrode coating thus applied is dried by a method which varies depending on the kind of the solvent. For example, it can be dried with hot air of a temperature of 80 to 300° C.

In the present invention, the electrode active material layer is formed by applying the electrode coating to one surface of the electrode current collector and then dried under the above-described conditions. Before the electrode coating is applied to the back surface (the other surface, surface B) of the electrode current collector and dried, this surface to be coated must be cleaned with water. By this cleaning operation, the adhesion of the electrode active material layer to the back surface (surface B) of the electrode current collector can be remarkably improved Water used for the cleaning may be any of pure water (distilled water), ion-exchanged water, tap water, industrial water, well water, etc. Among them pure water and ion-exchanged water having a low impurity content are preferred.

The electrode current collector can be cleaned by, for example, a method which comprises winding a cloth around a roller, impregnating the cloth with water and rotating it to bring it into contact with the current collector; a method which comprises winding a cloth around a rod, impregnating the cloth with water and reciprocating the rod widthwise in contact with the electrode current collector; or a method wherein water or water vapor is directly jetted to the electrode current collector. Other embodiments of the cleaning method are obvious to those skilled in the art. However, in immersion methods such as a dipping method, bad effects may be exerted, such as falling-off of the dried coating layer and, therefore, the layer must be carefully protected by, for example, masking.

For facilitating the drying operation after the cleaning, a mixture of water and an organic solvent may be used for the cleaning so far as the cleaning effect is not reduced. The organic solvents usable herein are those highly soluble in water such as methanol, ethanol and acetone.

The amount of the organic solvent is usually 0 to about 60% by weight, preferably 0 to about 50% by weight, based on the mixture.

The cleaning temperature is usually about 5 to 50° C., preferably about 10 to 40° C. When this temperature is excessively low, the defining eject is reduced and, on the contrary, when it is excessively high, the foil is possibly denatured after the cleanup. When the temperature is kept in this range, water vapor can be used in place of water. The term "water" thus indicates herein not only water but also water vapor.

When the electrode coating is applied to the back surface of the electrode current collector, the surface is preferably dry. Therefore, the water is wiped off with a dry cloth or air is blown against the electrode current collector to dry it.

The thickness of the electrode having the electrode active material layers on both sides of the current collector can be controlled, if necessary, by roller pressing or the like.

The electrode material thus obtained is then cut into pieces having predetermined width and length. Preferably, a part of the electrode current collector is left free from the electrode active material layer so as to provide electric contact with the outside. The material partially lacking the electrode active material layer can be formed by, for example, a method wherein an uncoated pant is formed in the coating step or a method wherein the electrode active material layer is once formed and then a part thereof is removed.

The adhesion of the electrode active material layer, formed at first on one surface (surface A) of the electrode current collector to this surface A is higher that of the electrode active material layer, formed on the other surface (surface B) thereof, to this surface B. The reasons why the adhesion to the surface B is inferior to that of the surface A have not been elucidated yet. Although it has not been theoretically proved yet, the mechanism is supposed to be as follows: The acid contained in the coating is evaporated during the drying and adheres to the surface B of the electrode current collector to form some compound with a metal of the electrode current collector. Although it was considered to solve such a problem of the poor adhesion, by differentiating the ratio of the electrode active material to the binder on the surface A from the ratio on the surface B, such a method causes a problem that the varied of the electrode coatings to be prepared is increased in number, and the steps in the production process age increased to make the process complicated. The present inventors have surprisingly discovered that the cleaning of the surface B with water after the coating of the surface A and before the coating of the surface B of the current collector is very effective in efficiently improving the adhesion without necessitating such complicated steps.

The present invention will now be further illustrated by reference to certain examples, which are provided solely for purposes of illustration and are not intended to be limitative.

EXAMPLE 1

1. Composition for Cathode Coating Material

The coating composition for the cathode is as follows:

|  | parts by weight |
| --- | --- |
| Graphite (cathode active material) | 100 |
| Acetylene black (electric conductor) | 5 |
| PVDF (hinder) | 10 |
| NMP (solvent) | 115 |
| Oxalic acid dihydrate (acid) | 1 |

The cathode coating was prepared as described below.

10 parts by weight of the binder were dissolved in 50 parts by weight of the solvent to obtain 60 parts bar weight of a lacquer. 10 parts by weight of the lacquer was added to 5 parts by weight of acetylene black and the resultants mixture was kneaded. The balance (50 parts by weight) of the lacquer and 65 parts by weight of the solvent were added to the kneaded mixture, and they were thoroughly mixed together. 100 parts by weight of the cathode active material was mixed therein and then 1 part by weight of oxalic acid dihydrate was added thereto to obtain the cathode coating.

2. Preparation of Cathode

The cathode coating prepared as described above, was applied to a rolled copper foil having a thickness of 18 μm by the nozzle coating method and then dried in a drying furnace at 110° C. (coating of surface A). The back surface (surface B) of the foil having the coated surface A was wiped with a non-woven fabric imprecated with water and then dried. The foil was rolled and the back surface (surface B) was coated in the some manner as that for surface A. The electrode current collector having the electrode active material layers on both surfaces was compression-molded with a roller press and cut into pieces to be used as cathodes.

EXAMPLE 2

The same procedure as that of Example 1 was repeated except that the pure water was replaced by tap water.

EXAMPLE 3

The some procedure as that of Example 1 was repeated except that the pure water was replaced by water/ethanol (weight ratio: 1/3).

EXAMPLE 4

The same procedure as that of Example 1 was repeated except that the pure water was replaced by water/ethanol (weight ratio: 1/3).

Comparative Example 1

The same procedure as that of Example 1 was repeated except that surface B was coated directly after the coating of surface A without any treatment, to obtain a sample of Comparative Example 1.

Comparative Example 2

The same procedure as that of Example 1 was repeated except that the pure water was replaced by ethanol, to obtain a sample of Comparative Example 2.

Comparative Example 3

The same procedure as that of Example 1 was repeated except that the pure water was replaced by methyl ethyl ketone, to obtain a sample of Comparative Example 3.

3. Evaluation Method

Determination of Contact Angle

The contact angles at three points, close to one another, of the surface of each sample (copper foil having uncoated surface B) were determined with a contact angle meter (CA-D; a product of Kyowa Kaimen Kagaku K. K.) by using pure water as the liquid for the determination, and the average of them was taken as the contact angle of the sample. The larger the contact angle, the higher the hydrophobicity.

Adhesion

The electrode current collector was cut into pieces of 1 cm×10 cm. A pressure-sensitive adhesive double coated tape was applied to a supporting plate. An end part (3 cm) of the surface, to be tested, of the electrode current collector (surface with electrode active material layer) was stuck on the tape. The electrode current collector was bent at such a curvature that it would not be broken off, while the other unstuck edge was pulled at a constant rate of 2 cm/sec with a tensile testing machine, to conduct the peeling test. The degree of exposure of the copper foil was determined according to the following criteria:

A: Less than 20% of the copper foil was exposed.
B: 20 to 80% of the copper foil was exposed.
C: More than 80% of the copper foil was exposed.

Solvent Resistance

The electrode active material laborer remaining after the above-described tests was rubbed five times with a cotton swab impregnated with methyl ethyl ketone, and the solvent resistance thereof was evaluated according to the following criteria:

A: The electrode acquire material layer was not peeled off at all.
B: The electrode active material layer was slightly peeled off.
C: The electrode active material layer was wholly peeled off after rubbing five times or less.
D: The electrode active material layer was wholly peeled off after rubbing twice or less.

The test results are shown in following Table 1.

TABLE 1

|  | Contact Angle | Peeling Resistance | Solvent Resistance |
| --- | --- | --- | --- |
| Surface A | 81.7° (before coating) | A | A |
| Example 1 | 75.0° | A | B |
| Example 2 | 70.3° | A | B |
| Example 3 | 62.3° | A | B |
| Example 4 | 45.5° | A | C |
| Comp. Ex. 1 | 41.1° | B | D |
| Comp. Ex. 2 | 40.0° | A | D |
| Comp. Ex. 3 | 23.2° | B | D |

It is thus clear that the adhesion of the electrode active material layer to the back surface is surprisingly improved by cleaning the back surface with water after forming the electrode active material layer on the front surface of the electrode current collector and before the application of the electrode coating to the back surface. Thus, according to the process of the present invention, crack formation in the electrode active material layer and peeling-off of the tile layer from the electrode current collector can be effectively prevented. Further, since the amount of the binder in the electrode coating is reduced, the relative amount of the electrode active material can be increased.

Having described the present invention, it will now be apparent that many changes and modifications may be made to the above-described embodiments without departing from the spirit and the scope of the present invention.

What is claimed is:

1. A process for producing an electrode for a battery, which comprises the steps of successively applying an electrode coating containing a cathode active material, a binder, a solvent and an acid to both surfaces of an electrode current collector, wherein after applying the electrode coating to one surface of the electrode current collector and drying said electrode coating, the other surface thereof is cleaned with water or a mixture of water and an organic solvent prior to the application of the electrode coating thereto;

wherein the cathode active material is a carbonaceous material; and wherein the acid is selected from the group consisting of oxalic acid, formic acid, maleic acid, and hydrates thereof.

2. The process of claim 1, wherein the cleaning is conducted by using water.

3. The process of claim 2, wherein the water is distilled water.

4. The process of claim 1, wherein the cleaning is conducted by using a mixture of water and an organic solvent.

5. The process of claim 4, wherein the organic solvent is selected from the group consisting of methanol, ethanol and acetone.

6. The process of claim 4, wherein the organic solvent is used in an amount of up to 60% by weight based on the mixture of water and the organic solvent.

7. The process of claim 1, wherein the carbonaceous material is selected from the group consisting of amorphous carbon, acetylene black, petroleum coke, coal coke, artificial graphite, natural graphite and graphite carbon fibers.

8. The process of claim 1, wherein the acid is used in an amount of 0.001 to 5 parts by weight per 100 parts by weight of the electrode active material.

9. The process of claim 1, wherein the electrode current collector is made of metal foil.

10. The process of claim 8, wherein the acid is used in an amount of 0.01 to 3 parts by weight per 100 parts by weight of the electrode active material.

11. The process of claim 1, wherein the electrode coating comprises about 10 to 80% by weight, based on the solid content of the electrode coating, of the electrode active material.

12. The process of claim 1, wherein the binder comprises polyacrylonitrile, polyethylene terephthalate, polyvinylidene fluoride or polyvinyl fluoride.

13. The process of claim 1, wherein said solvent comprises N-methylpyrrolidone, pyrrolidone, N-methylthiopyrrolidone, dimethylformamide, dimethylacetamide or hexamethylphosphamide.

14. The process of claim 1, wherein said cleaning is conducted at a temperature of 10 to 40° C.

15. The process of claim 11, wherein said electrode coating comprises about 30 to 60% by weight of the electrode active material.

* * * * *